US007941049B2

(12) United States Patent
Nakano et al.

(10) Patent No.: US 7,941,049 B2
(45) Date of Patent: May 10, 2011

(54) OPTICAL TRANSMISSION APPARATUS WITH OPTICAL AMPLIFIERS

(75) Inventors: Hiroyuki Nakano, Yokohama (JP); Hiroshi Takeuchi, Tokyo (JP); Hiroshi Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 716 days.

(21) Appl. No.: 11/946,151

(22) Filed: Nov. 28, 2007

(65) Prior Publication Data

US 2008/0199181 A1 Aug. 21, 2008

(30) Foreign Application Priority Data

Nov. 29, 2006 (JP) ................................. 2006-321022

(51) Int. Cl.
*H04J 14/02* (2006.01)

(52) U.S. Cl. .............. 398/92; 398/79; 398/83; 398/173; 398/175

(58) Field of Classification Search .................... 398/92, 398/79, 83–85, 157, 48, 45, 173, 175, 177
See application file for complete search history.

(56) References Cited

U.S. PATENT DOCUMENTS

| | | | | |
|---|---|---|---|---|
| 6,377,394 B1 * | 4/2002 | Drake et al. | ............. | 359/341.41 |
| 6,437,906 B1 * | 8/2002 | Di Pasquale et al. | ...... | 359/337.2 |
| 6,687,049 B1 * | 2/2004 | Sulhoff et al. | ............. | 359/341.4 |
| 7,010,229 B2 * | 3/2006 | Copeland et al. | ............... | 398/92 |
| 7,197,245 B1 * | 3/2007 | Islam et al. | ..................... | 398/82 |
| 7,199,921 B2 * | 4/2007 | Kaspit et al. | ............... | 359/337.4 |
| 7,460,298 B2 * | 12/2008 | Li et al. | ..................... | 359/341.32 |
| 2003/0117696 A1 * | 6/2003 | Goobar et al. | ............. | 359/337.2 |
| 2003/0142389 A1 * | 7/2003 | Gray et al. | ..................... | 359/334 |
| 2008/0152352 A1 * | 6/2008 | Papernyi | ...................... | 398/157 |

FOREIGN PATENT DOCUMENTS

| JP | 06-164515 | 6/1994 |
|---|---|---|
| JP | 06-296056 | 10/1994 |

OTHER PUBLICATIONS

H. Nakano, S. Sasaki, "Dispersion-Compensator Incorporated Optical Fiber Amplifier", IEEE Photonics Technology Letters, vol. 7, No. 6, Jun. 1995.

* cited by examiner

*Primary Examiner* — Ken N Vanderpuye
*Assistant Examiner* — Hibret A Woldekidan
(74) *Attorney, Agent, or Firm* — Antonelli, Terry, Stout & Kraus, LLP.

(57) ABSTRACT

An optical transmission apparatus including an optical amplifier for providing a high-power optical amplifier on the receive side, in which a wavelength of pumping light for an optical amplifier on the transmission side is suitably shifted to be different from a wavelength of pumping light for an optical amplifier on the receive side, pumping optical power for the optical amplifier on the transmission side is not all consumed in a doped fiber in amplification process, and remnant pump light that was left surplus is added by a wavelength multiplex coupler to the pumping light for the optical amplifier on the receive side, thereby enhancing a gain and light output without an increase in output power of the pumping light used for the optical amplifier on the receive side.

8 Claims, 9 Drawing Sheets

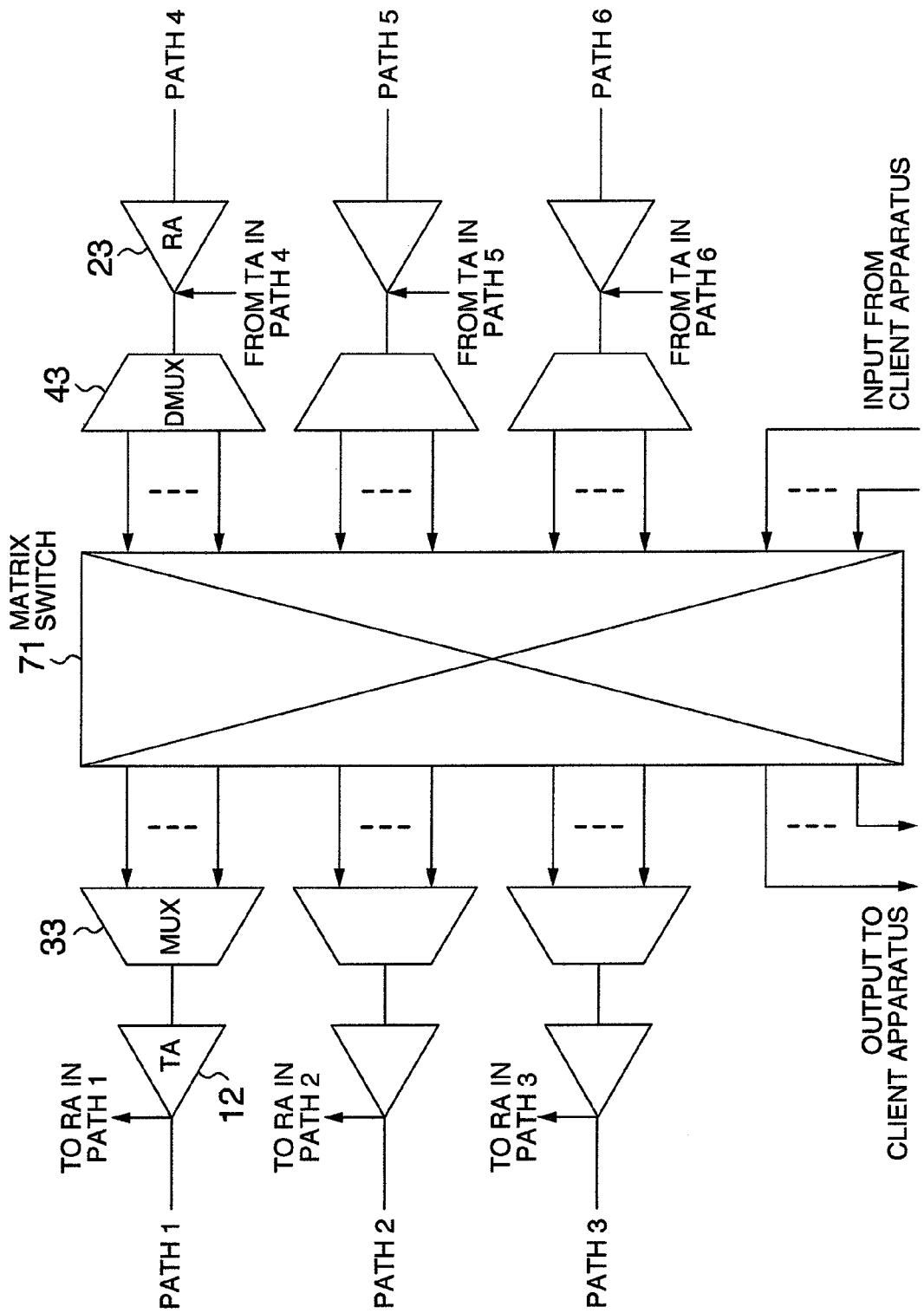

OPTICAL TRANSMISSION APPARATUS WITH OPTICAL AMPLIFIERS

INCORPORATION BY REFERENCE

The present application claims priority from Japanese application JP2006-321022 filed on Nov. 29, 2006, the content of which is hereby incorporated by reference into this application.

BACKGROUND OF THE INVENTION

The present invention relates to an optical transmission apparatus, and more particularly, to a wavelength division multiplexer (WDM) for multiplexing in one optical fiber a multi-wavelength optical signal correctively and having an optical amplifier for amplifying the multi-wavelength optical signal.

Recently, to transmit a larger volume of data, a wavelength division multiplexing technology to multiplex a plurality of optical signals having a different wavelength has been used. As for an optical transmission apparatus for repeating the optical signals multiplexed in wavelength, for example, an optical add/drop multiplexer (OADM) in which a part of a plurality of wavelengths of data to be transmitted are dropped to receive and a part of the plurality of wavelengths are added to transmit, and an optical cross-connect (OXC) in which a plurality of wavelengths is switched to an arbitrary channel are expected. It is thought that most of optical transmission apparatuses in a long distance core network or metro network in the future will be displaced with such OADM or OXC.

It is necessary for an optical amplifier in an optical network using the OADM or OXC to secure a necessary optical signal to noise ratio (SNR) by amplifying an optical signal lowered due to transmission loss between nodes, as well as by amplifying power of the optical signal lowered due to insertion loss of an optical multiplexer, an optical demultiplexer or an optical switch, and further to amplify the signal so that an optical level falls into an input dynamic range of an optical receiver. As described above, the optical amplifier plays an important role in the optical network using the OADM or OXC, and will be increasingly used in the entire optical network. Therefore, for the optical network's development, it is extremely important to provide a economical optical amplifier.

When for an optical amplifier, for example, a doped fiber is used, pumping light directed from a pump light source into the optical amplifier supplies energy to amplify an optical signal. H. Nakano, S. Sasaki, "Dispersion-Compensator Incorporated Optical Fiber Amplifier", IEEE PHOTONICS TECHNOLOGY LETTERS, VOL. 7, No. 6, June 1995, describes a technology that two optical amplifiers connected in series share pumping light emitted from one pump light source. Further, JP-A-6-296056 and FIG. 4 of JP-A-6-164515 disclose that an optical amplifier on the transmission side and an optical amplifier on the receive side share a pump light source.

SUMMARY OF THE INVENTION

In an optical transmission apparatus such as the OADM or OXC for repeating an optical signal, an optical amplifier is used not only for compensation for loss due to an transmission path optical fiber to secure an optical SNR necessary for securing the quality of signal, but for compensation for loss that an optical signal incurs when passing through an optical component such as an optical multiplexer/demultiplexer or an optical switch in an apparatus. However, the conventional technologies described above used an optical amplifier without considering the loss due to the optical component in an apparatus, and therefore, concerning such optical transmission apparatus, it is necessary to manufacture an apparatus at a low cost designed to effectively use a pump light source.

The present invention, to solve the problems described above, proposes, concerning an optical amplification portion installed on each of the input side and the output side of an optical component such as an optical switch, that pumping light that was not used to remain in the optical amplification portion for amplifying an optical signal that passed through the optical component be directed to the optical amplification portion for amplifying an optical signal to be output to the optical component.

According to the present invention, because remnant pump light that is surplus in an optical amplifier on the transmission side can be recycled as pumping light for amplification in an optical amplifier for receiving high-power light, output power of an pump light source used for the optical amplifier on the receive side or the number of pump light sources can be reduced for it. As for a cost of an optical amplifier for high-power light, a cost of the pump light source is predominant, realizing cost reduction. At the same time, conditions for thermal design of pump light source are alleviated, providing an advantage of miniaturization of an optical amplification board. Because the optical amplifier is used in all nodes of an optical network in the future, cost reduction and miniaturization of the optical amplifier can bring out a large advantage in the whole system.

Other objects, features and advantages of the invention will become apparent from the following description of the embodiments of the invention taken in conjunction with the accompanying drawings.

BRIEF DESCRIPTION OF THE DRAWINGS

FIG. 9 shows one embodiment of another configuration of the OXC.

DETAILED DESCRIPTION OF THE INVENTION

Now, embodiments of the present invention will be hereinafter described.

Embodiment 1

Figure 1:
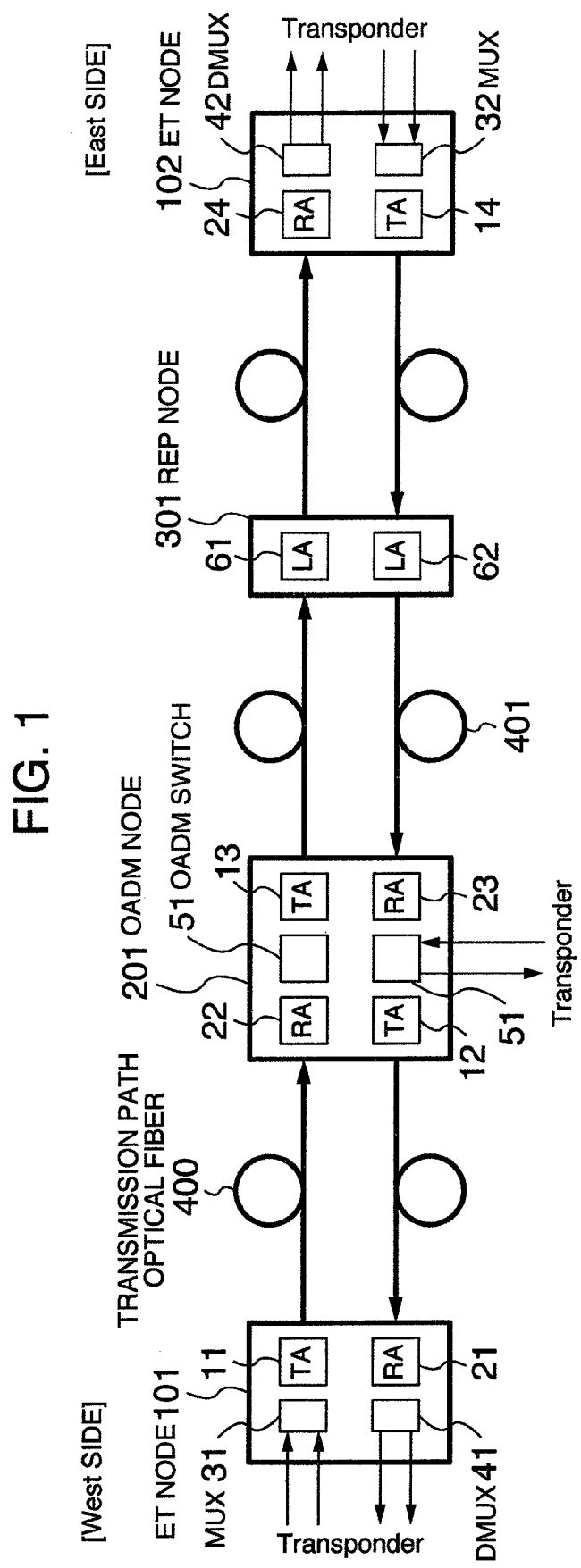
FIG. 1 shows one embodiment of a configuration of an optical amplification board.

FIG. 1 is an overall view of an OADM system. From the left side, a WDM end terminal (ET) node 101, an OADM node 201, a repeater (REP) node 301 and an ET node 102 are disposed, and each is bi-directionally connected by transmission path optical fibers 400. Here, the left side of the drawing is defined as the west side and the right side is defined as the east side. The ET node 101 is a node for sending an optical signal transmitting from the west side to the east side in the OADM system, and is connected to transponders respectively having a different wavelength. Signals from the transponders having a different wavelength are respectively multiplexed in wavelength by a multiplexer 31 (MUL), and sent to one transmission path optical fiber 400 through an optical amplifier 11 on the transmission side. The number of wavelengths multiplexed by the multiplexer 31 is various depending on a system, and, for example, an optical signal having about 40 to 80 wavelengths is multiplexed. The REP node 301 directly amplifies the optical signal multiplexed in wavelength in the block by using a line amplifier 61 (LA), and sends the optical signal to the ET node 102 on the east side. The ET node 102 on the east side amplifies the optical signal sent by the ET node 101 on the west side, or a multi-wavelength signal formed of an added signal in the OADM node 201 in the block by using an optical amplifier 24 for receiving, and separates the optical signal into optical signals having individual wavelength by using a demultiplexer DMUX 42 to output to a transponder corresponding to the individual wavelength. Signal propagation from the west side to the east side has been described above, and also signal propagation from the east side to the west side is similar.

Figure 2:
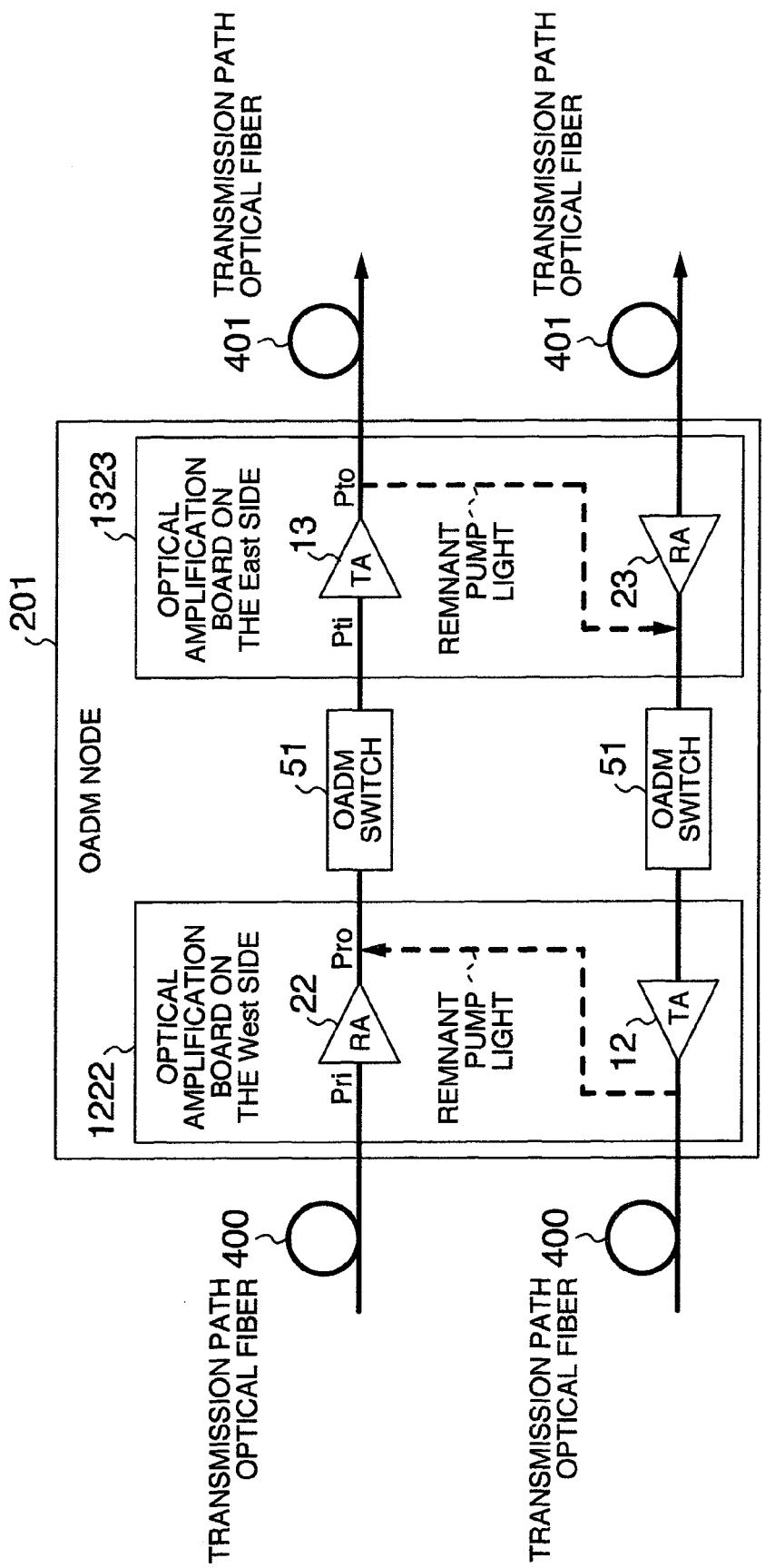
FIG. 2 is one embodiment of an overall view of an OADM system.

FIG. 2 shows a configuration of the OADM node 201. The OADM node 201 receives a signal incoming through the transmission path optical fiber 400 on the west side, amplifies the signal by using a receiver amplifier (RA) 22 on the receive side, subsequently adds, drops or passes through in an OADM switch portion 51, then amplifies the signal again by using a transmitter amplifier (TA) 13 on the transmission side, and sends the signal to a transmission path optical fiber 401 on the east side. Concerning the inverse direction, it is similar, and the OADM node 201 receives a signal incoming through the transmission path optical fiber 401 on the east side, amplifies the signal by using an optical amplifier 23 on the receive side, subsequently adds, drops or passes through in the OADM switch portion 51, amplifies the signal again by using an optical amplifier 12 on the transmission side, and sends the signal to the transmission path optical fiber 400 on the west side. Here, the optical amplifier 12 on the transmission side and the optical amplifier 22 on the receive side for inputting/outputting the optical signal to/from the transmission path optical fiber 400 are installed together on an optical amplification board 1222 on the west side. Further, the optical amplifier 13 on the transmission side and the optical amplifier 23 on the receive side for inputting/outputting the optical signal to/from the transmission path optical fiber 401 are installed together on an optical amplification board 1323 on the east side. On the optical amplification board 1222 on the west side, remnant pump light of the optical amplifier 12 on the transmission side is used for amplification in the optical amplifier 22 on the receive side, by separating the remnant pump light from the multi-wavelength optical signal sent to the transmission path optical fiber 400 and adding it in the opposite direction to the traveling direction of the multi-wavelength optical signal that passed through the optical amplifier 22 on the receive side. Also, on the optical amplification board 1323 on the east side, remnant pump light of the optical amplifier 13 on the transmission side is used for amplification in the optical amplifier 23 on the receive side, by separating the remnant pump light from the multi-wavelength optical signal sent to the transmission path optical fiber 401 and adding it in the opposite direction to the traveling direction of the multi-wavelength optical signal that passed through the optical amplifier 23 on the receive side.

Output power of an optical amplifier on the transmission side (TA) is limited because of an effect of degrading the quality of signal due to a nonlinear effect of a transmission path fiber. Therefore, rather than the optical amplifier on the transmission side, enhancing output power of an optical amplifier on the receive side (RA) effectively contributes to enhancement of the optical SNR and extension of transmission range. For that purpose, the optical amplifier on the receive side has to have high-power output. In the present embodiment, an optical transmission apparatus is configured to use the remnant pump light of the optical amplifier on the transmission side for the optical amplifier on the receive side. A gain and output optical power of an optical amplifier, for example, in the case using an erbium (Er)-doped optical fiber amplifier, are determined by an Er concentration or a length of the Er-doped optical fiber, by pumping light power, or by input power of the optical amplifier.

Figure 3:
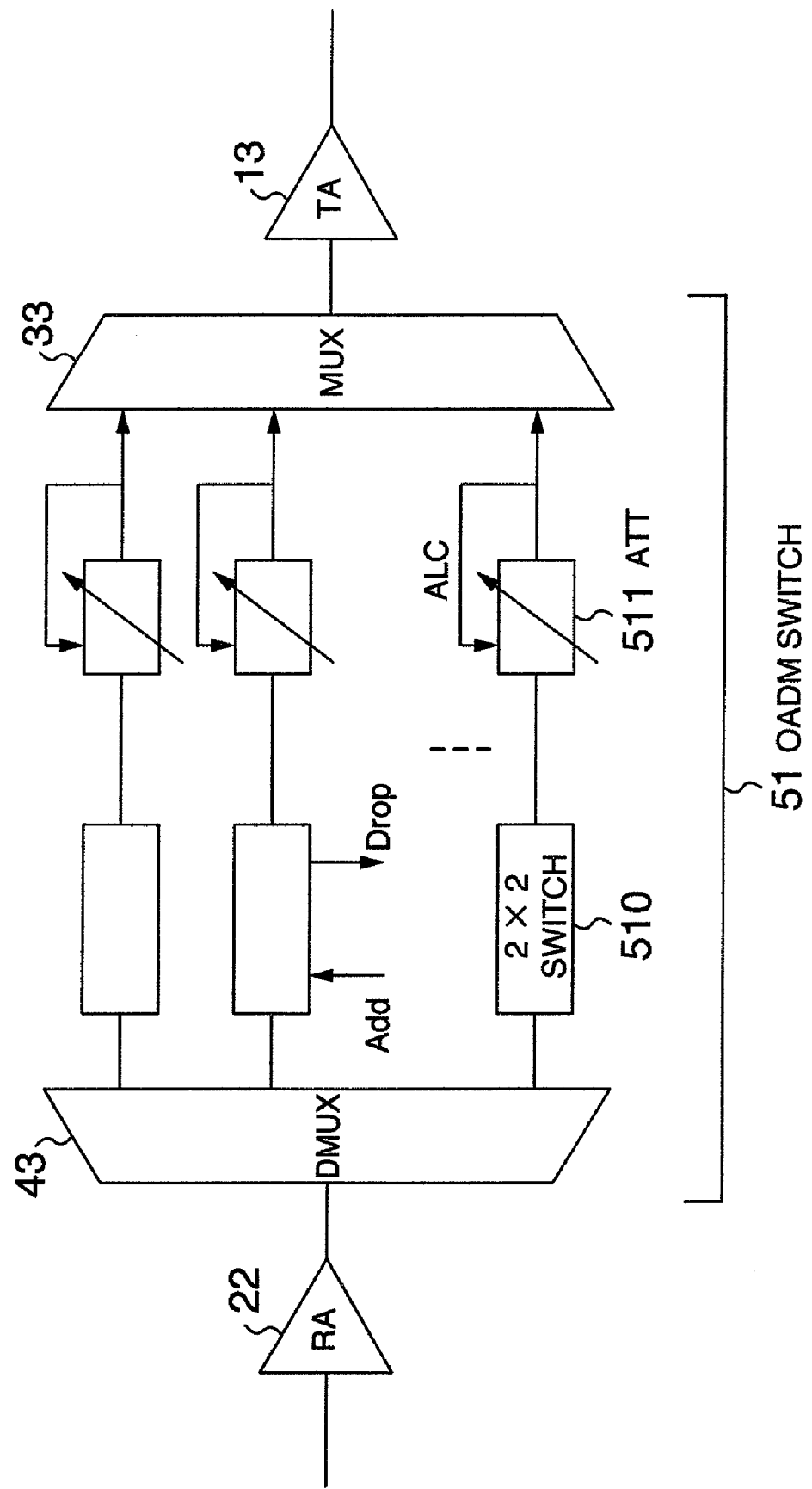
FIG. 3 shows one embodiment of an internal configuration of an OADM node.

FIG. 3 shows an internal configuration of the OADM node 201. The multi-wavelength signal supplied from the west side is amplified in the block by the optical amplifier 22 on the receive side, subsequently separated into an optical signal having individual wavelength by a demultiplexer 43. A 2×2 optical switch 510 drops and adds the optical signal having the individual wavelength in an add/drop mode, and passes through the optical signal in a through mode. In the add/drop mode, an optical signal added or dropped is output/input to/from another device through a transponder connected to the OADM node 201. At this time, in the OADM system, an optical path is set up between the ET node 101 on the west side and the OADM node 201. In the through mode, the optical signal directly passes through the 2×2 optical switch 510, is transmitted to the east side, and finally connected to a transponder of the ET node 102 on the east side. In this case, in the OADM system, an optical path is set up between the ET node 101 and the ET node 102. A variable attenuator 511 situated after the 2×2 optical switch 510 sets an input optical signal to a desired level of light by using automatic level control (ALC). A multiplexer 33 multiplexes again an optical signal supplied from each variable attenuator 511 in wavelength, and the multi-wavelength signal is amplified in the block by the optical amplifier 11 on the transmission side, and subsequently sent to the transmission path optical fiber on the east side.

Figure 4:
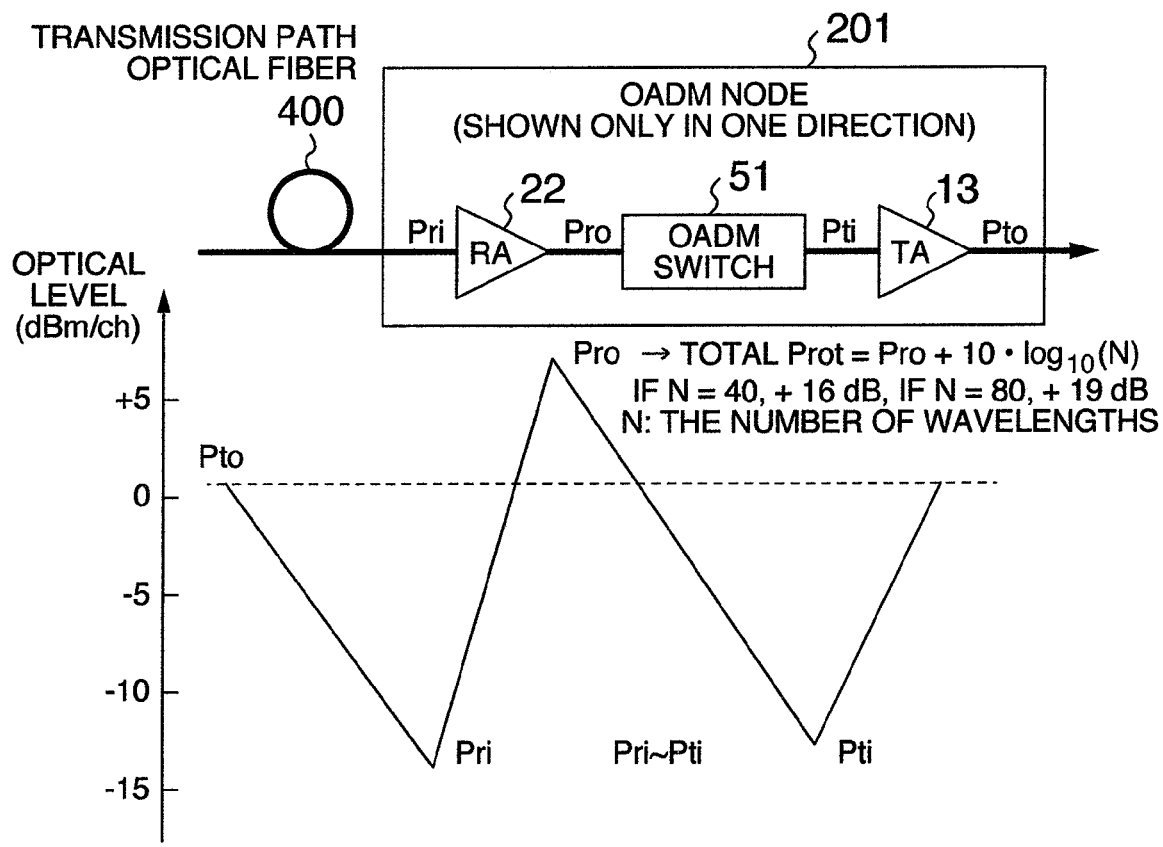
FIG. 4 shows one embodiment of an optical level diagram in the OADM node.

FIG. 4 shows an example of an optical level diagram in the OADM node 201. The longitudinal axis indicates an optical power level per wavelength (per channel) [dBm/ch]. Let an output power level of an optical signal supplied by the ET node 101 be Pto. The optical signal having the power level Pto sent by the ET node 101 incurs loss due to the transmission path optical fiber 400, lowering the power level to an optical level Pri, and is received by the OADM node 201. The optical level Pri is amplified by the optical amplifier 22 on the receive side to reach the optical level Pro. The optical level Pro incurs loss due to passing through the OADM switch 51, lowering to an optical level Pti. The optical level Pti is again amplified by the optical amplifier 13 on the transmission side to the optical level Pto, and transmitted to the next REP node 301 through the transmission path optical fiber 401.

In the example of the level diagram, while the optical level Pto is set to about +1 dBm/ch to suppress an effect of a nonlinear effect of the transmission path optical fibers 400, 401, the optical level Pro is set to about +7 dBm/ch that is a comparatively high optical level, to secure the optical SNR. That is, considering the loss due to the OADM switch 51, the optical amplifier 22 on the receive side is set to output an optical signal having an optical level higher than that of the optical amplifier 13 on the transmission side. In this case, a total optical power level of an optical signal in all wavelengths supplied by the optical amplifier 22 on the receive side is +23 dBm in the case of 40 wavelengths, and +26 dBm in the case of 80 wavelengths. Therefore, concerning an Er-doped optical fiber amplifier usually used, the optical output level is extremely high. To achieve such high output optical level, a pump light source has to be a high power class having output power such as several hundred mW to 1 W. For that purpose, in the present embodiment, remnant pump light that was not consumed to be surplus when pumping light passed through the optical amplifier 13 on the transmission side is configured to enter the optical amplifier 22 on the receive side.

Figure 5:
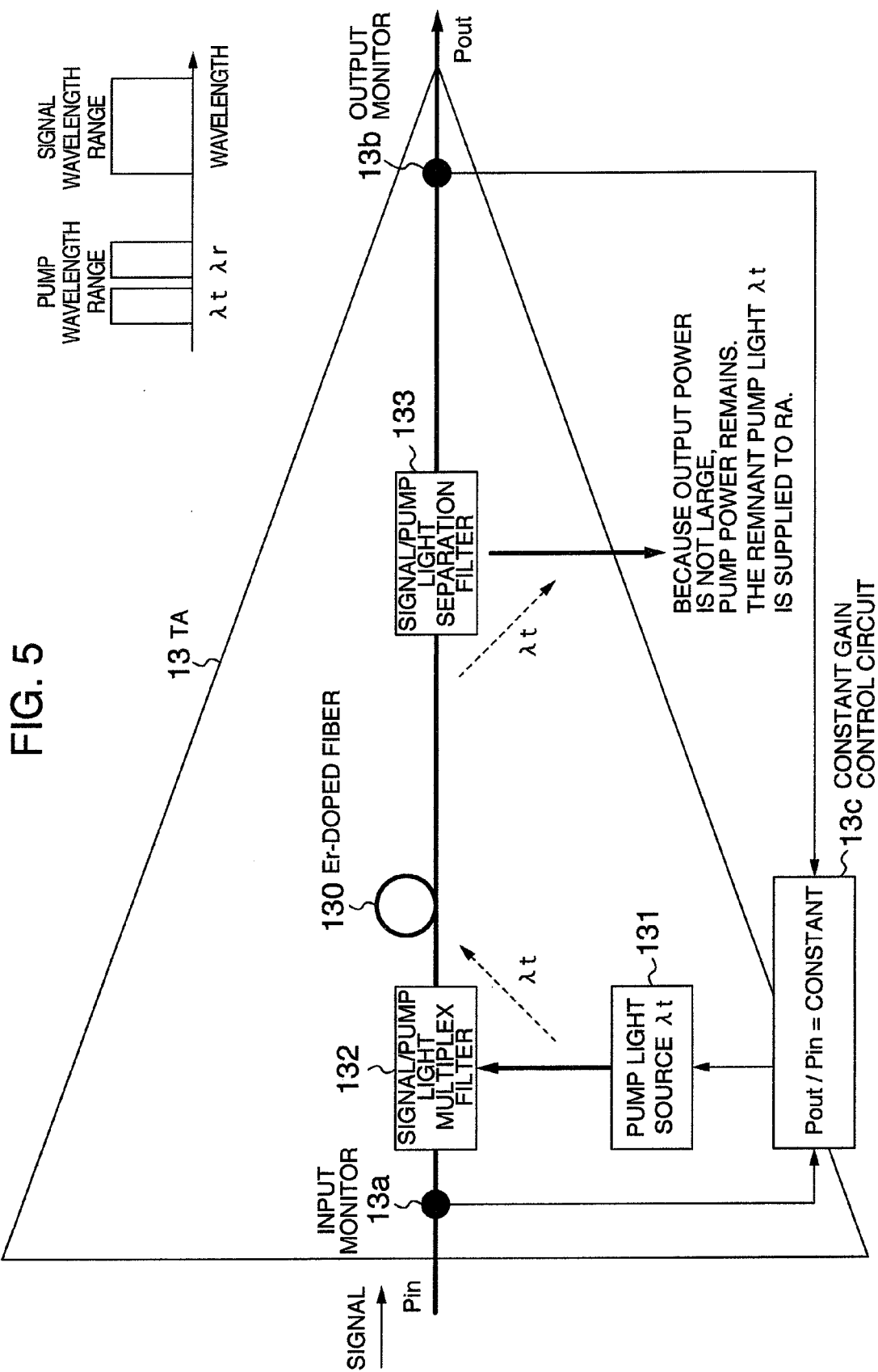
FIG. 5 shows one embodiment of a configuration of a transmission optical amplifier TA.

Next, configurations of the optical amplifier 13 on the transmission side and the optical amplifier 22 on the receive side will be described. FIG. 5 shows the configuration of the optical amplifier 13 on the transmission side. The optical amplifier 13 on the transmission side includes an Er-doped fiber 130, a pump light source 131, a signal/pumping light multiplex filter 132, and a signal/pumping light separation filter 133. An inserted drawing on the upper right side shows the relation between a signal wavelength range to be amplified and a pump wavelength range of pumping light wavelength. In the case of an Er-doped fiber optical amplifier, the signal wavelength range is a band of 1550 nm, or 1580 nm etc., and the pump wavelength range is a band of 980 nm, or 1480 nm etc. In the present embodiment, the pump wavelength range of 1480 nm is divided into two portions: a first pump wavelength range λt (for example, 1460 to 1475 nm); and a second pump wavelength range λr (for example, 1480 to 1495 nm), but the division of the wavelength range is not limited to this, the wavelength range that is the band of 980 nm may be divided into two wavelength ranges, or the wavelength ranges of 980 nm and 1480 nm may be respectively used as the wavelength range λr or the wavelength range λt. Here, for the pump light source 131 for the optical amplifier 13 on the transmission side, the first pump wavelength range λt is used. A multi-wavelength optical signal and pumping light from the pump light source 131 are multiplexed in the signal/pumping light multiplex filter 132 and the multi-wavelength signal is amplified by using energy of the pumping light when passing through the Er-doped fiber 130. Remnant pump light in the wavelength range λt that was not consumed in the Er-doped fiber 130 is separated by the signal/pumping light separation filter 133 to supply from the optical amplifier 13 on the transmission side to the optical amplifier 23 on the receive side.

Now, gain control of the optical amplifier 13 on the transmission side will be described. To amplify multi-wavelength light, it is necessary to control a gain to be constant for suppressing change in wavelength dependence of gain so that a ratio Pout/Pin of a total output power (Pout) to a total input power (Pin) of all wavelengths is constant. In FIG. 5, monitoring each value by an input monitor 13a and an output monitor 13b, the monitored results are fed back to the pump light source 131 through a constant gain control circuit 13c to change the output power, thereby controlling the ratio Pout/Pin to be constant. This is a generally used control method. In addition, an amplitude value to be measured of the optical signal monitored by the input monitor 13a and the output monitor 13b may be power level of the multi-wavelength optical signal, or power level of a part of an optical signal included in the multi-wavelength optical signal or an optical signal having a particular wavelength in the multi-wavelength optical signal.

Figure 6:
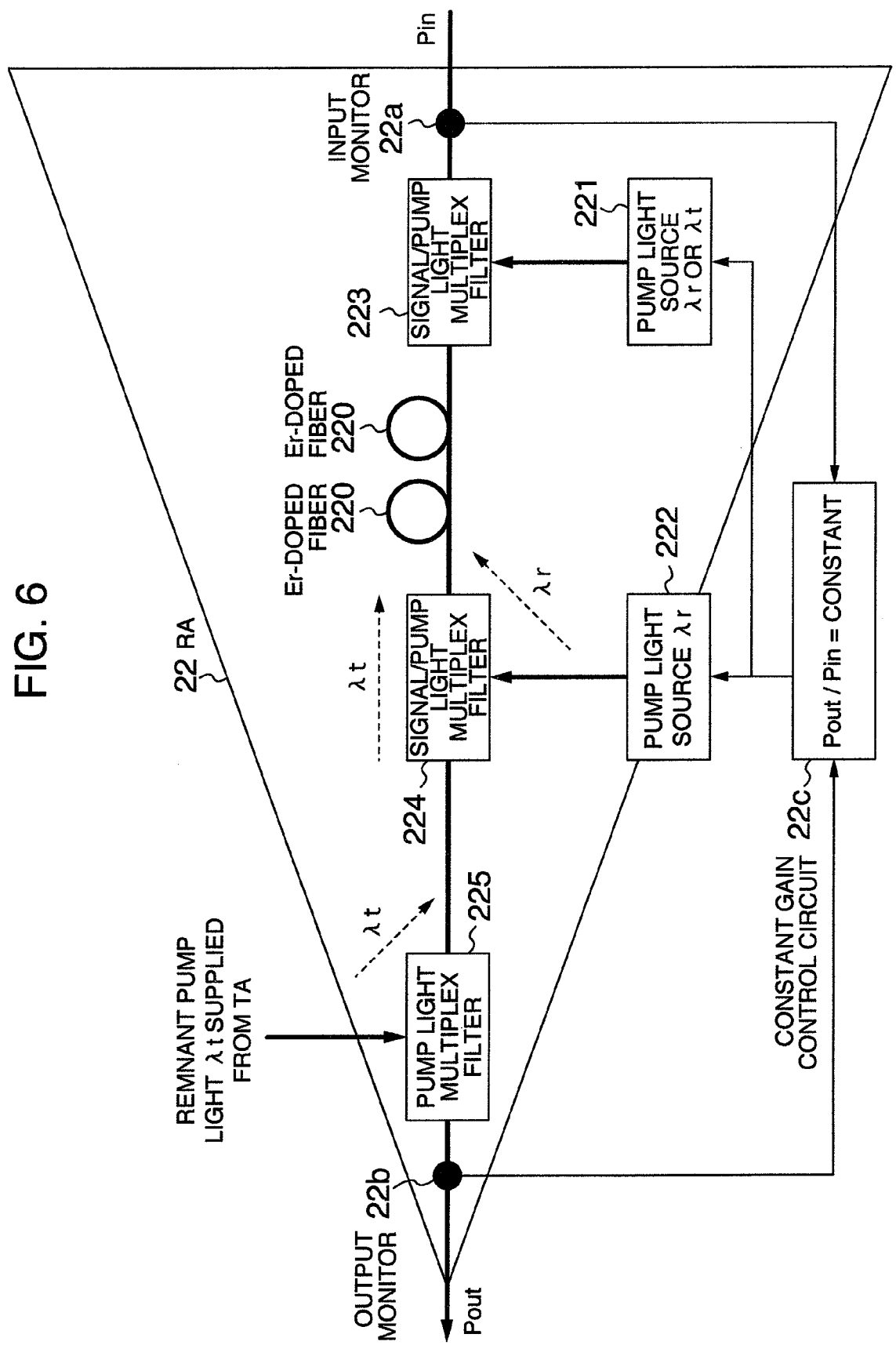
FIG. 6 shows one embodiment of a configuration of a receive optical amplifier RA.

FIG. 6 shows the configuration of the optical amplifier 22 on the receive side. The optical amplifier 22 on the receive side includes an Er-doped fiber 220, a pump light source 221 for outputting pumping light in any one of the wavelength range λr or the wavelength range λt, a pump light source 222 for outputting pumping light in the wavelength range λt, a signal/pumping light multiplex filter 223, a signal/pumping light multiplex filter 224, and a pumping light multiplex filter 225. A multi-wavelength signal and light from the pump light source 221 are multiplexed by the signal/pumping light multiplex filter 223, and a multi-wavelength optical signal and also light from the pump light source 222 are multiplexed by the signal/pumping light multiplex filter 224, thereby amplifying the multi-wavelength optical signal in the Er-doped fiber 220. The remnant pump light in the wavelength range λt that was not consumed in the optical amplifier 12 on the transmission side in FIG. 1 is multiplexed by the pumping light multiplex filter 225, passes through the signal/pumping light multiplex filter 224, and is used for amplification in the Er-doped fiber 220. Here, the signal/pumping light multiplex filter 224 is a filter that transmits the pumping light in the wavelength range λt from left to right, the pumping light in the wavelength range λr from beneath to right, and the signal wavelength range from right to left, and can be formed of, for example, a dielectric multilayer film.

Gain control of the optical amplifier 22 on the receive side will be described. Monitoring a level Pin of an optical signal by an input monitor 22a and a level Pout of an optical signal by an output monitor 22b, respectively, the monitored results are fed back to the pump light source 221 and the pump light source 222 by a constant gain control circuit 22c to change output power, thereby controlling a ratio Pout/Pin to be constant. The remnant pump light supplied by the optical amplifier 12 on the transmission side is not controlled, thereby preventing the optical amplifier 22 on the receive side from interfering with the optical amplifier 12 on the transmission side. Further, when the remnant pump light from the optical amplifier 12 on the transmission side changes in power, the change is suppressed by controlling the pump light sources 221 and 222. In addition, the constant gain control circuit 22c may control both the pump light sources 221 and 222, or at least one of them.

Figure 7:
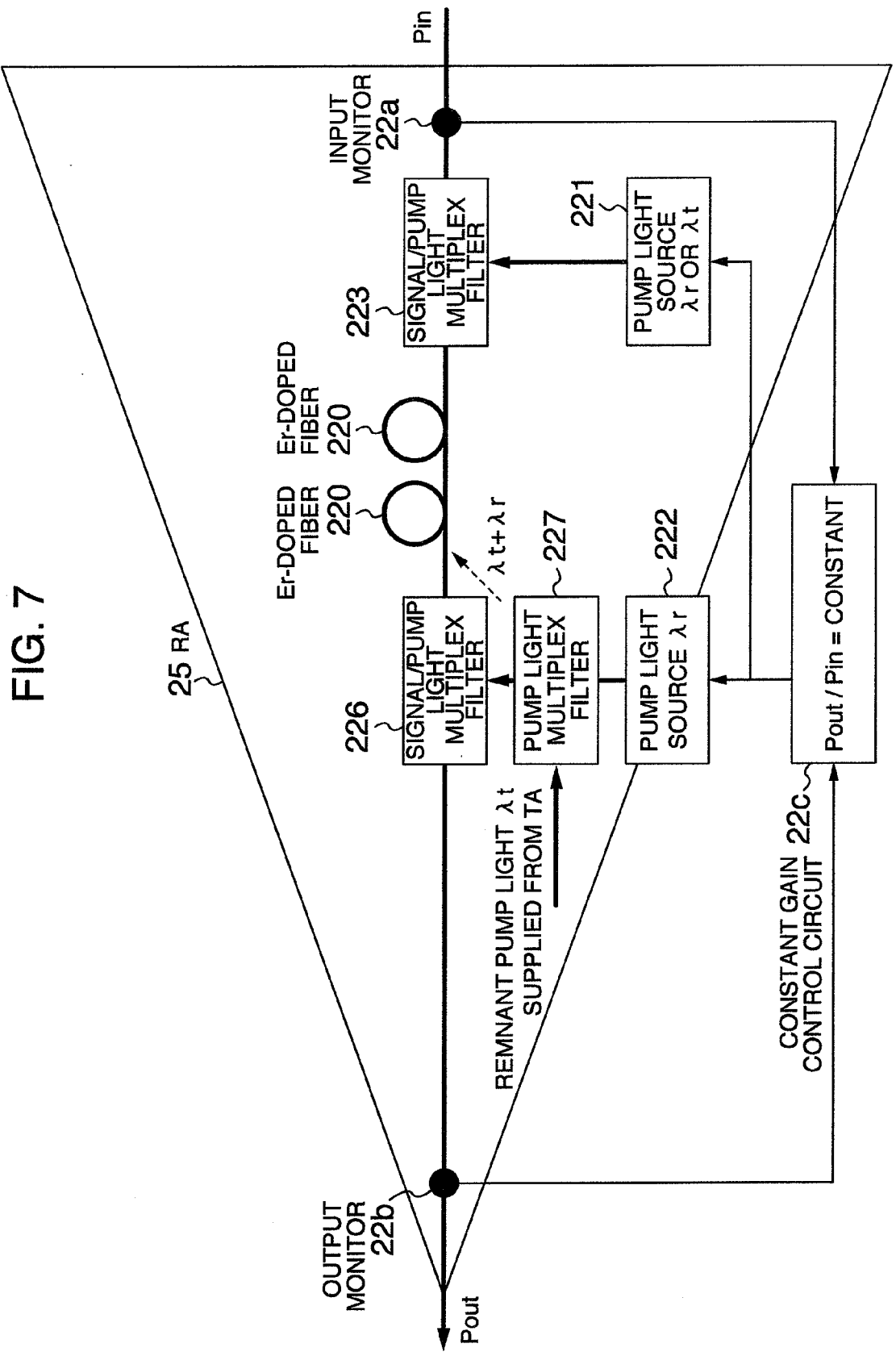
FIG. 7 shows one embodiment of a configuration of the receive optical amplifier RA.

FIG. 7 shows an optical amplifier 25 on the receive side having a different configuration from that of FIG. 6. The difference from the optical amplifier 22 on the receive side of FIG. 6 resides in pumping light multiplex filters 226 and 227. The pumping light multiplex filter 227 multiplexes the pumping light in the wavelength range λt from the optical amplifier 12 on the transmission side and the pumping light in the wavelength range λr from the pump light source 222. Then, the signal/pumping light multiplex filter 226 multiplexes the pumping light in the wavelength range λt and the wavelength range λr from the pumping light multiplex filter 227 and a signal light. Gain control of the optical amplifier 25 on the receive side is similar as described in FIG. 6. In addition, in one optical transmission apparatus, the optical amplifiers 22 and 25 on the receive side can be used in any combination. That is, the optical amplifier 22 on the receive side may be used on the east side and the optical amplifier 25 on the receive side may be used on the west side.

As described above, when the gain or the output optical power are comparatively small, focusing attention on existence of the remnant pump light, in the present invention, it is thought that this remnant pump light is used for another optical amplifier, and further the remnant pump light and the pumping light for another optical amplifier are made different in wavelength. By making the wavelengths of the pumping light different, the remnant pump light from the optical amplifier on the transmission side and the pumping light from the pump light source 222 can be effectively multiplexed by a multi-wavelength coupler, thereby enhancing the gain or the output light power of the optical amplifiers 22, 25.

Embodiment 2

Figure 8:
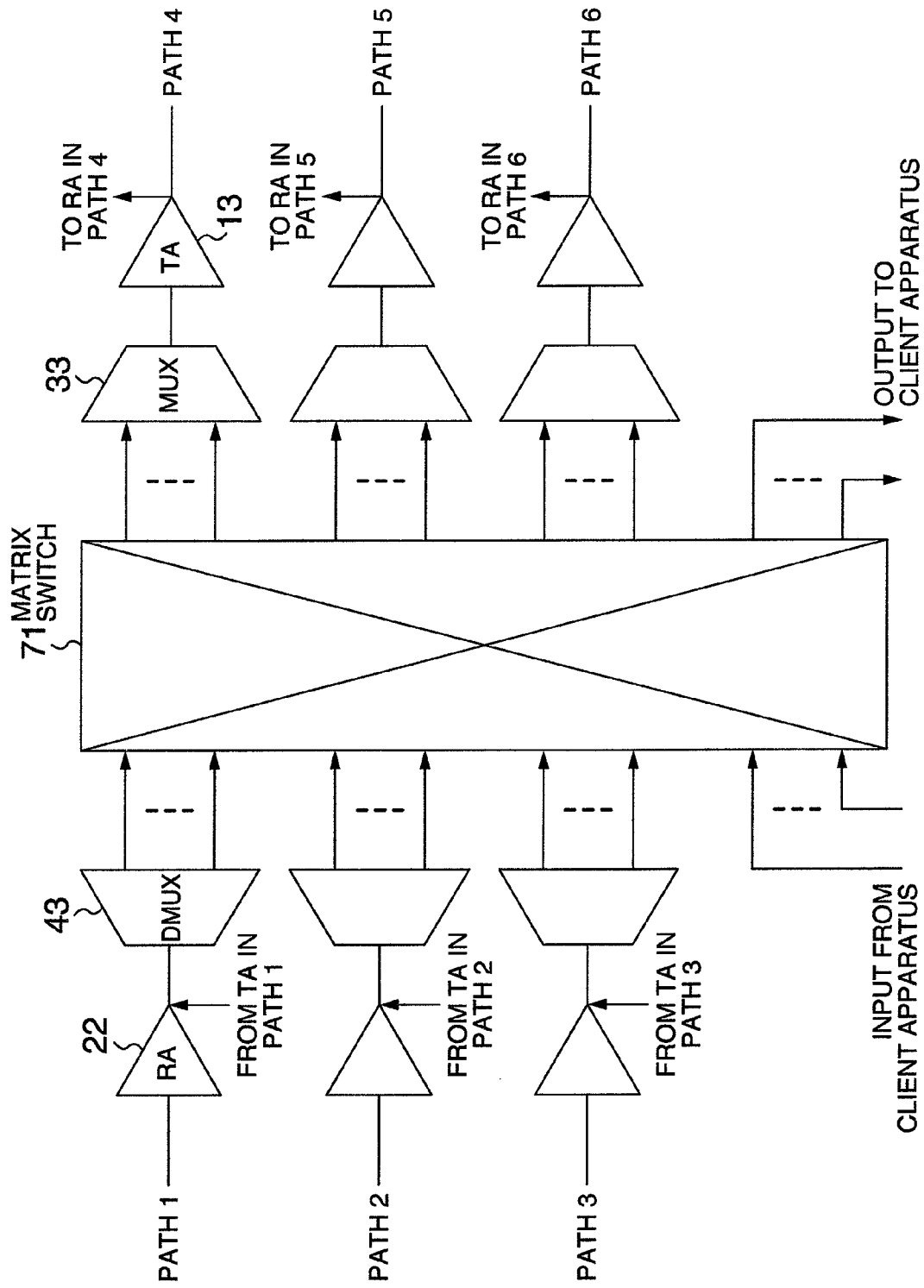
FIG. 8 shows one embodiment of a configuration of an OXC.

Referring to block diagrams in FIGS. 8, 9, a second embodiment of the present invention will be described. FIGS. 8, 9 show a configuration of an OXC node, which is a system in which a multi-wavelength optical signal input/output to/from a transmission path fiber of a channel 1 to a channel 6 is switched to an arbitrary channel for every wavelength, a signal is output to a client apparatus in the OXC node itself, and a signal is received from the client apparatus. For simplicity of drawing, FIGS. 8, 9 show separately.

In FIG. 8, signals incoming from the transmission path optical fibers of the paths 1, 2, 3 are received and amplified by the optical amplifiers 22 on the receive side. The demultiplexer 43 demultiplexes an amplified optical signal to an optical signal for individual wavelength. Paths of the optical signals having the individual wavelength and a signal supplied by the client apparatus are switched over by a matrix switch 71. The paths of a part of the optical signals having the individual wavelength are switched to the client apparatus, and other signals are multiplexed in wavelength by the multiplexer 33, and subsequently sent to the paths 4, 5, 6. The optical amplifier 13 on the transmission side again amplifies the optical signal supplied to the paths 4, 5, 6.

The OXC node in FIG. 9 receives a signal incoming from the transmission path optical fiber of the paths 4, 5, 6, amplifies by using the optical amplifier 23 on the receive side, and subsequently demultiplexes for individual wavelength by using the demultiplexer 43. The matrix switch 71 switches paths of the optical signals having the individual wavelength and a signal supplied by the client apparatus to individual paths, and outputs a part of the signals to the client apparatus and a part to the multiplexer 33. The optical amplifier 12 on the transmission side again amplifies the multi-wavelength optical signal supplied to the paths 1, 2, 3.

The optical amplifier 12 on the transmission side and the optical amplifier 22 on the receive side are installed on the optical amplification board 1222 on the path 1 side (or on the path 2 or 3 side), similarly to FIG. 1. The optical amplifier 13 on the transmission side and the optical amplifier 23 on the receive side are installed on the optical amplification board 1323 on the path 4 side (or on the path 5 or 6 side). On the optical amplification board 1222, the remnant pump light of the optical amplifier 12 on the transmission side is separated from a main signal, added to the main signal passing through the Er-doped fiber 220, and then used for amplification in the optical amplifier 22 on the receive side. Further, on the optical amplification board 1323, the remnant pump light of the optical amplifier 13 on the transmission side is separated from a main signal, added to the main signal passing through the Er-doped fiber 220, and then used for amplification in the optical amplifier 23 on the receive side.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical transmission apparatus for transmitting a multi-wavelength optical signal, comprising:

a first optical amplification portion for amplifying a multi-wavelength optical signal incoming from a first optical transmission path by using pumping light emitted from a first pump light source;

a first switch portion for switching a path for every wavelength of a multi-wavelength optical signal from the first optical amplification portion;

a second optical amplification portion for amplifying a multi-wavelength optical signal from the first switch portion by using pumping light emitted from a second pump light source and sending the signal to a second optical transmission path;

a third optical amplification portion for amplifying a multi-wavelength optical signal from a third optical transmission path by using pumping light emitted from a third pump light source;

a second switch portion for switching a path for every wavelength of a multi-wavelength optical signal from the third optical amplification portion; and a fourth optical amplification portion for amplifying a multi-wavelength optical signal from the second switch portion by using pumping light emitted from a fourth pump light source and sending the signal to a fourth optical transmission path, wherein the first optical amplification portion uses a first remnant pump light that is the remaining of the pumping light emitted from the fourth pump light source, used in the fourth optical amplification portion;

the third optical amplification portion uses a second remnant pump light that is the remaining of the pumping light emitted from the second pump light source, used in the second optical amplification portion, wherein a wavelength range of the pumping light of the first pump light source and a wavelength range of the pumping light of the fourth pump light source are different from each other, and a wavelength range of the pumping light of the second pump light source and a wavelength range of the pumping light of the third pump light source are different from each other.

2. The optical transmission apparatus according to claim 1, wherein the first optical amplification portion includes:

a first wavelength multiplex portion for adding the first remnant pump light to the multi-wavelength optical signal; and a second wavelength multiplex portion for adding the pumping light emitted from the first pump light source to the multi-wavelength optical signal, and the third optical amplification portion includes:

a third wavelength multiplex portion for adding the second remnant pump light to the multi-wavelength optical signal; and a fourth wavelength multiplex portion for adding the pumping light emitted from the third pump light source to the multi-wavelength optical signal.

3. The optical transmission apparatus according to claim 1, wherein the first optical amplification portion includes:

a first wavelength multiplex portion for adding the first remnant pump light to the pump light emitted from the first pump light source; and a second wavelength multiplex portion for adding pumping light including the first remnant pump light from the first wavelength multiplex portion and the pumping light emitted from the first pump light source to the multi-wavelength optical signal, and the third optical amplification portion includes:

a third wavelength multiplex portion for adding the second remnant pump light to the pumping light emitted from the third pump light source; and a fourth wavelength multiplex portion for adding pumping light including the second remnant pump light from the third wavelength multiplex portion and the pumping light emitted from the third pump light source to the multi-wavelength optical signal.

4. The optical transmission apparatus according to claim 2 or 3, wherein the first optical amplification portion includes a fifth pump light source and a fifth wavelength multiplex portion for adding pump light emitted from the fifth pump light source to the multi-wavelength optical signal, and the fourth optical amplification portion includes a sixth pump light source and a sixth wavelength multiplex portion for adding pumping light emitted from the sixth pump light source to the multi-wavelength optical signal.

5. The optical transmission apparatus according to claim 1, wherein the second optical amplification portion includes a first wavelength demultiplex portion for separating the first remnant pump light from the multi-wavelength optical signal, and the forth optical amplification portion includes a second wavelength demultiplex portion for separating the second remnant pump light from the multi-wavelength optical signal.

6. The optical transmission apparatus according to claim 1, wherein the first optical amplification portion includes:

a first monitor portion for monitoring at least a part of a power level of the multi-wavelength optical signal inputted to the first optical amplification portion;

a second monitor portion for monitoring at least a part of a power level of the multi-wavelength optical signal outputted from the first optical amplification portion; and a gain control portion for controlling an amplitude value of the pumping light emitted from the first pump light source, based on the power level monitored by the first monitor portion and the second monitor portion.

7. The optical transmission apparatus according to claim 4, wherein the first optical amplification portion includes:

a first monitor portion for monitoring at least a part of a power level of the multi-wavelength optical signal inputted to the first optical amplification portion;

a second monitor portion for monitoring at least a part of a power level of the multi-wavelength optical signal outputted from the first optical amplification portion; and a gain control portion for controlling an amplitude value of the pumping light emitted from at least one of the first pump light source and the fifth pump light source, based on the power level monitored by the first monitor portion and the second monitor portion.

8. The optical transmission apparatus according to claim 1, wherein the first optical amplification portion and the fourth optical amplification portion are installed on the same optical amplification board, and the second optical amplification portion and the third optical amplification portion are installed on the same optical amplification board.

\* \* \* \* \*